(12) United States Patent
Mack (10) Patent No.: US 6,860,488 B2
(45) Date of Patent: Mar. 1, 2005

(54) DRILL CHUCK WITH FRONT-END SHIELD

(75) Inventor: Hans-Dieter Mack, Sontheim (DE)

(73) Assignee: Rohm GmbH, Sontheim (DE)

( * ) Notice: Subject to any disclaimer, the term of this patent is extended or adjusted under 35 U.S.C. 154(b) by 64 days.

(21) Appl. No.: 10/267,474

(22) Filed: Oct. 9, 2002

(65) Prior Publication Data

US 2003/0080521 A1 May 1, 2003

(30) Foreign Application Priority Data

Oct. 10, 2001 (DE) .......................................... 101 49 958
Jun. 13, 2002 (EP) .......................................... 02013086

(51) Int. Cl.[7] .............................................. B23B 31/16
(52) U.S. Cl. ........................ 279/62; 279/125; 279/157
(58) Field of Search ............................. 279/62, 61, 60, 279/64, 125, 157

(56) References Cited

U.S. PATENT DOCUMENTS

| | | | | |
|---|---|---|---|---|
| 5,465,983 A | * | 11/1995 | Owens et al. ............... | 279/157 |
| 5,470,084 A | * | 11/1995 | Reibetanz et al. ......... | 279/19.3 |
| 5,476,273 A | * | 12/1995 | Shadeck et al. ........... | 279/60 |
| 5,590,985 A | * | 1/1997 | Mack .......................... | 408/56 |
| 5,765,839 A | | 6/1998 | Rohm | |
| 5,829,761 A | * | 11/1998 | Rohm .......................... | 279/62 |
| 6,517,088 B1 | * | 2/2003 | Rohm .......................... | 279/62 |
| 6,581,942 B2 | * | 6/2003 | Rohm .......................... | 279/62 |

* cited by examiner

Primary Examiner—Daniel W. Howell
(74) Attorney, Agent, or Firm—Herbert Dubno; Andrew Wilford (57) ABSTRACT

A drill chuck has a chuck body rotatable about a chuck axis and having a rear end adapted to fit with a drive spindle and a front end formed with a tool recess. A plurality of jaws angularly spaced on the body about the axis and exposed in the tool recess are radially displaceable relative to the body between inner and outer positions. A tightening ring is axially fixed but rotatable about the axis on the body. Screwthread formations between the tightening ring and the jaws can move the jaws radially together and radially apart. A tightening sleeve surrounding the body and connected to the tightening ring is adapted to be gripped by hand to rotate the ring in the directions. A shield sleeve surrounds the body between the tightening sleeve and the body front end and is supported on the body for rotation thereon about the axis independently of the body and of the tightening sleeve.

16 Claims, 9 Drawing Sheets

DRILL CHUCK WITH FRONT-END SHIELD

FIELD OF THE INVENTION

The present invention relates to drill chuck. More particularly this invention concerns hand-tightened chuck for a power drill.

BACKGROUND OF THE INVENTION

A drill chuck as described in U.S. Pat. No. 5,765,839 has a body provided centered on an axis with an annular array of teeth and a plurality of jaws radially displaceable relative to the body between inner and outer positions. A tightening ring is axially fixed but rotatable about the axis on the body in a tightening direction and in an opposite loosening direction and a pair of screwthread formations between the tightening ring and the jaws move the jaws radially together on rotation of the tightening ring in the tightening direction and radially apart on rotation of the tightening ring in the loosening direction. A locking member engageable with the teeth and angularly fixed on the tightening ring is radially displaceable between a locking position engaging the teeth and preventing rotation of the body in the loosening direction and a freeing position permitting free rotation of the body relative to the tightening ring. A setting ring angularly displaceable on the tightening ring is formed with a pair of angularly spaced and radially open seats. A pair of angularly spaced abutments between the setting ring and the tightening ring limit angular movement of the sleeve on the ring. A cam on the setting ring is engageable with the locking member for displacing the locking member into the locking position when the setting ring is in one of its end positions and for displacing the locking member into the freeing position when the setting ring is in the other of its end positions.

With this system a tightening sleeve surrounds the chuck body, extending backward from the very front end. This sleeve is attached to the tightening ring so that the user gets a good grip on it to tighten or loosen the chuck. There is therefore no need for a separate key.

The disadvantage of this system is that, when drilling, the front end of the chuck often bumps up against the workpiece or another stationary object. Depending on the drilling direction, this engagement causes torque to be exerted on the tightening sleeve to loosen or tighten it. Thus the chuck can inadvertently be tightened so much that it is very difficult to loosen the chuck, or the chuck gets so loose the tool spins or falls out.

OBJECTS OF THE INVENTION

It is therefore an object of the present invention to provide an improved hand-tightenable drill chuck.

Another object is the provision of such an improved hand-tightenable drill chuck which overcomes the above-given disadvantages, that is which is protected against the above-described inadvertent overtightening or loosening.

SUMMARY OF THE INVENTION

A drill chuck has according to the invention a chuck body rotatable about a chuck axis and having a rear end adapted to fit with a drive spindle and a front end formed with a tool recess. A plurality of jaws angularly spaced on the body about the axis and exposed in the tool recess are radially displaceable relative to the body between inner and outer positions. A tightening ring is axially fixed but rotatable about the axis on the body in a tightening direction and in an opposite loosening direction. Screwthread formations between the tightening ring and the jaws can move the jaws radially together on rotation of the tightening ring in the tightening direction and radially apart on rotation of the tightening ring in the loosening direction. A tightening sleeve surrounding the body and connected to the tightening ring is adapted to be gripped by hand to rotate the ring in the directions. In accordance with the invention a shield sleeve surrounds the body between the tightening sleeve and the body front end and is supported on the body for rotation thereon about the axis independently of the body and of the tightening sleeve.

Thus with this system if the front end of the chuck, covered by the rotatable shield sleeve, bumps against a workpiece or stationary object when drilling, the shield sleeve will simply rotate. No significant torque will be transmitted to the tightening sleeve so that the chuck will not be loosened or overtightened.

The tightening sleeve according to the invention has a front-end support ring rotatably supporting the shield sleeve. The shield sleeve has a front-end rim engaged around and angularly slidable on the support ring. In addition the tightening sleeve can be provided with rolling elements engaging and supporting the shield sleeve. These elements can be balls and the support ring is formed as a cage holding the balls.

It is also possible according to the invention for the tightening sleeve to have a surface on which the shield sleeve slides. This can be a smooth frustoconical surface. Alternately the shield sleeve has a radially inwardly projecting coupling formation and the tightening sleeve is formed with a radially outwardly open groove slidably receiving the formation. The coupling formation can be an array of stamped inwardly projecting bumps or a radially inwardly projecting annular ridge.

The shield sleeve according to the invention has a tapered rear edge so that it bears at worst in line contact with the tightening ring and cannot transmit significant torque to it. In addition it projects axially rearward over a portion of the tightening sleeve. In this case the shield sleeve is formed with radially throughgoing holes dimensioned to allow a user's fingers to engage through the holes directly with the tightening sleeve. The shield sleeve in such an arrangement can be made of sheet metal while the tightening sleeve can be formed of a durable plastic.

To most effectively protect the chuck, the shield sleeve extends axially forward past the chuck body. Thus when drilling through a workpiece when the chuck inevitable bumps against this workpiece there will be no transmission of torque to either the chuck body or tightening sleeve.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
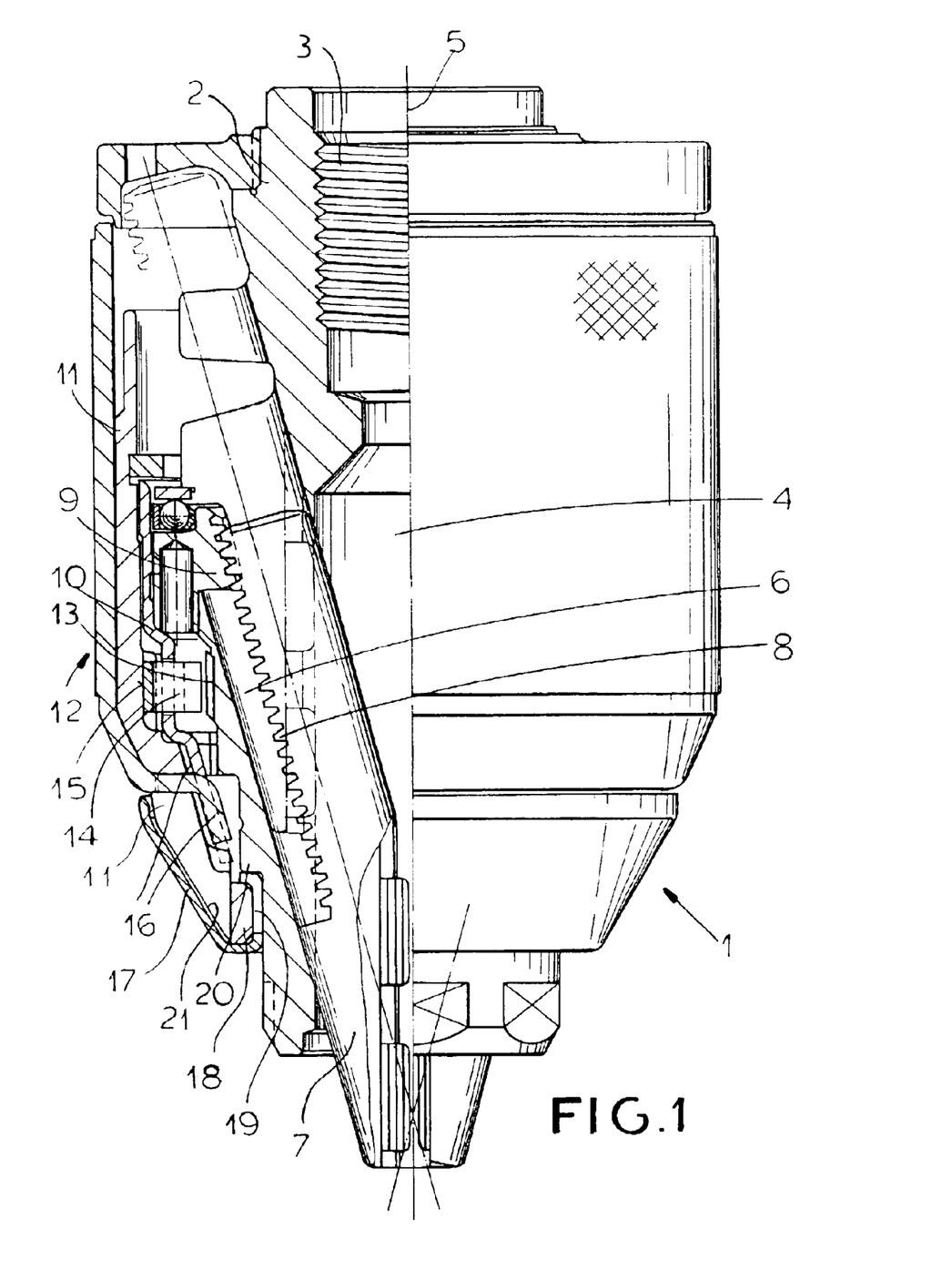
FIGS. 1 and 2 are axial sections through chucks in accordance with the invention.

As seen in FIG. 1, a chuck 1 according to the invention has a chuck body 2 centered on an axis 5 and formed with an axially rearwardly open threaded bore 3 that is normally fitted on a drive-unit spindle. Three angularly equipped jaws 7 are axially and radially displaceable in respective guides 6 and extend into a front tool recess 4 of the chuck 1 to grip an until-lustrated tool bit and rotate it about the axis 5. The bore 3 and recess 4 are axially interconnected so a hammer rod can engage therethrough with a tool chucked in the recess 4 when the chuck 1 is used on a hammer drill. A tightening ring 9 rotatable on the chuck body 2 about the axis 5 has an internal screwthread that meshes with external rows of teeth 8 on the backs of the jaws 7 that when it is rotated on the body 2 via a coupling sleeve 10 in a tightening direction it brings the jaws 7 forward and together, and when oppositely rotated in a loosening direction it moves them oppositely. The tightening ring 9, which is formed in two parts, bears axially backward via a roller bearing on a snap ring set in the body 2 so that it is axially fixed thereon.

A locking mechanism 12 is provided to prevent the tightening ring 9 from rotating in the opening direction 14 on the chuck body 2 except when this is intentionally desired. The locking mechanism 12 has an axially centered row of notches 13 on the outer surface of the body 2 or a nonrotatable ring fixed to it and at least one latching member 14 that is spring-biased radially inwardly to engage in the notches 13 and that extends through the coupling sleeve 10. The latching member 14 can be pushed into a position disengaged from the notches 13 by a cam 15 on the tightening sleeve 11 so as to be movable relative to the tightening ring 9. Abutments 16 angularly couple the sleeves 10 and 11 to the ring 9 while permitting limited relative angular displacement. This mechanism corresponds to that described in above-cited patent 5,765,839.

According to the invention the chuck 1 carries a shield sleeve 17 that is basically frustoconical and that has a forward inwardly turned rim 19 engaged around a support ring 18 formed on the inner end of the sleeve 11. The rim 19 bears against a planar forwardly directed annular shoulder 20 formed on the chuck body 2. This shield sleeve 17 rides on an outer surface 21 of a front part of the tightening sleeve 11 so that it can rotate freely about the axis 5. Thus if this sleeve 17 is bumped against a stationary object during drilling, it will rotate freely and the tightening sleeve 11 will not be affected. The drill chuck 1 will therefore not be inadvertently tightened or loosened.

Figure 2:
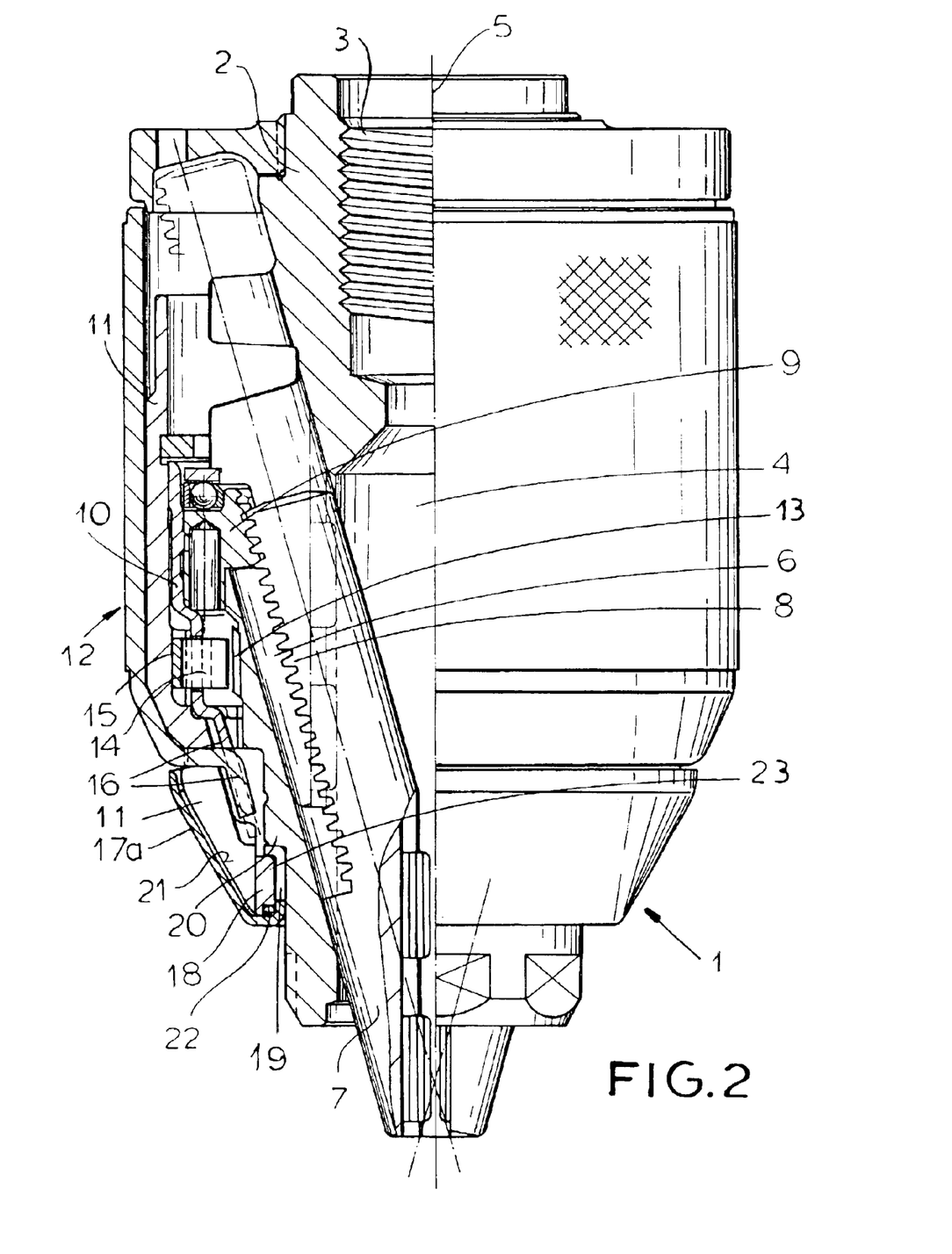

In FIG. 2 the shield sleeve 17a is supported via roller balls 22 riding in a groove 23 of the ring 18. This ensures very free rotation of the sleeve 17a relative to the sleeve 11.

Figure 3:
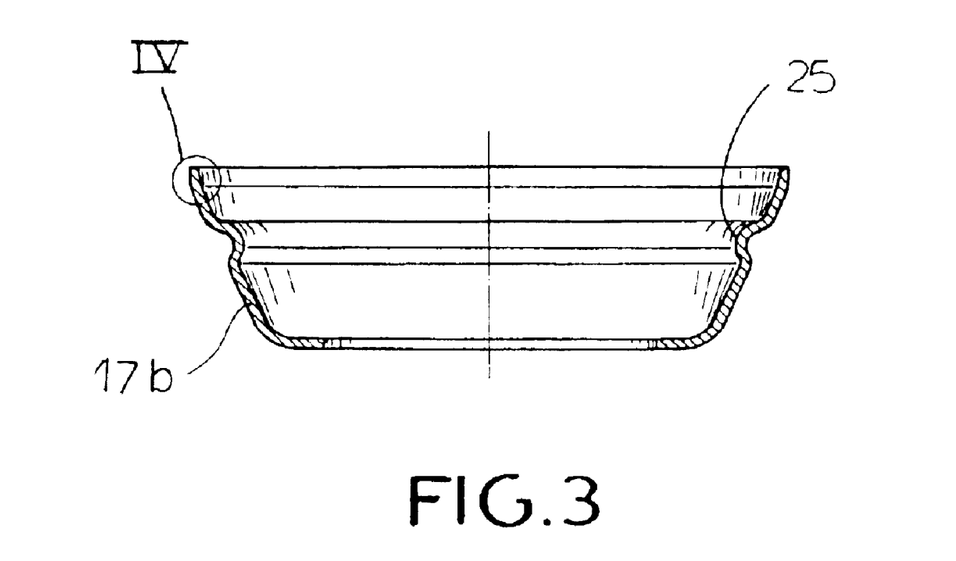
FIG. 3 is an axial section through a shield sleeve.
Figure 4:
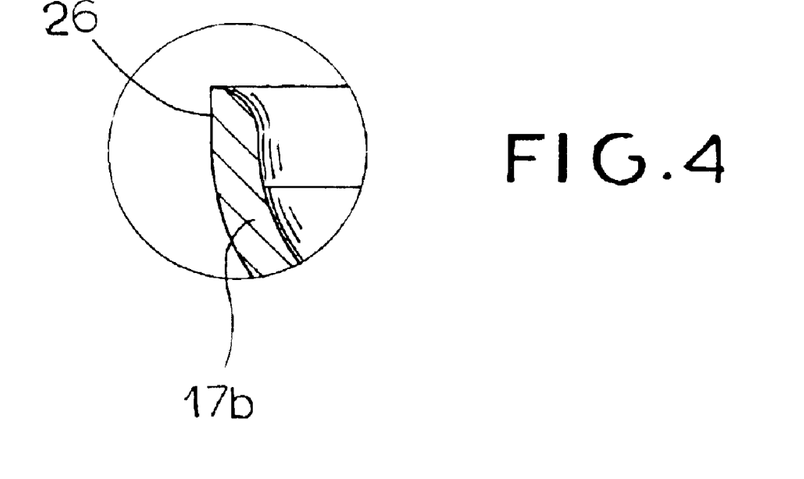
FIG. 4 is a large-scale view of the detail indicated at IV in FIG. 3.

FIGS. 3 and 4 show a sleeve 17b formed with a radially inwardly projecting ridge 25 and having a rear edge 26 that is beveled outward to fit with the sleeve 11. This ridge 25 fits as will be described below with a radially outwardly open groove in the sleeve 11 to hole the sleeve 17b on the sleeve 11 while permitting relative rotation.

Figure 5:
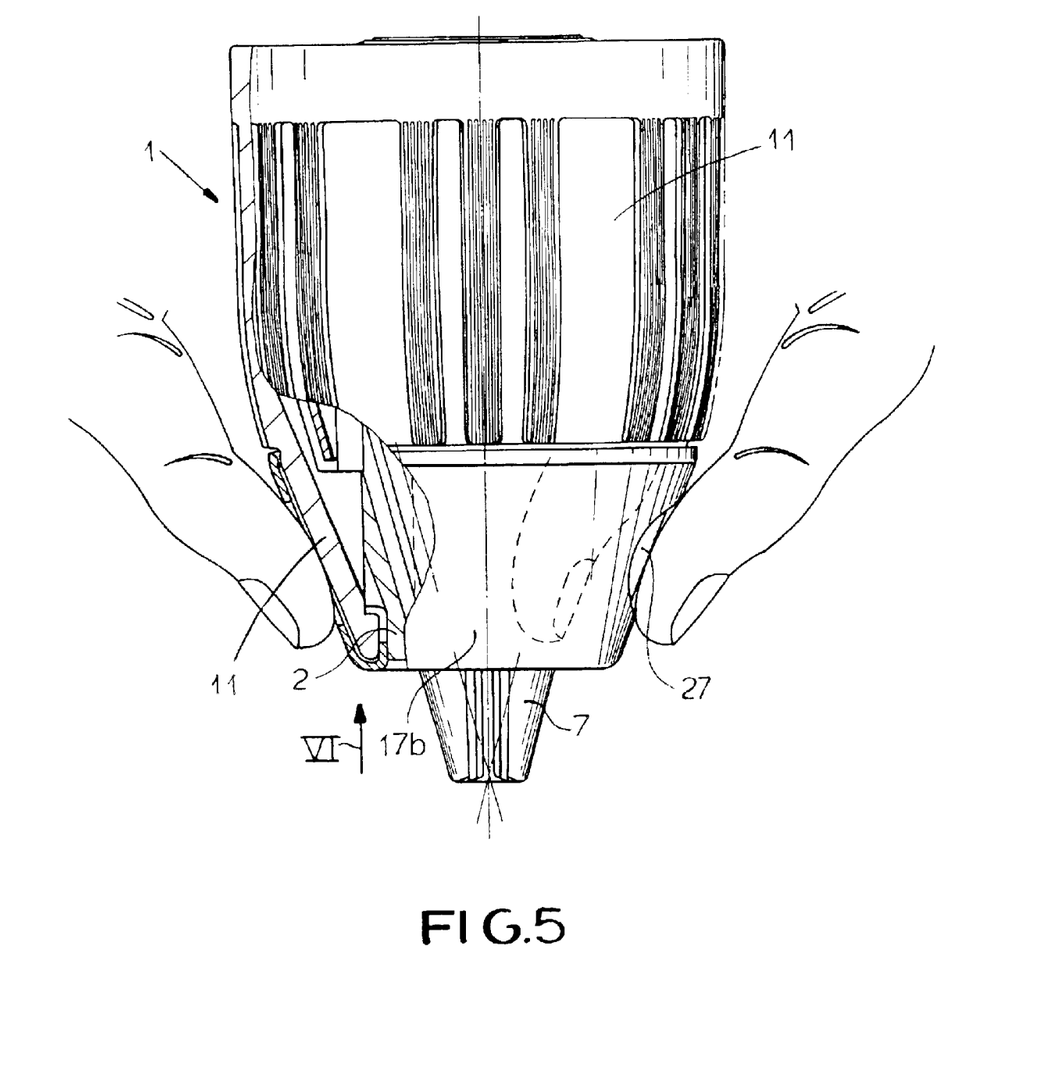
FIG. 5 is a partly sectional side view of another chuck according to the invention.
Figure 6:
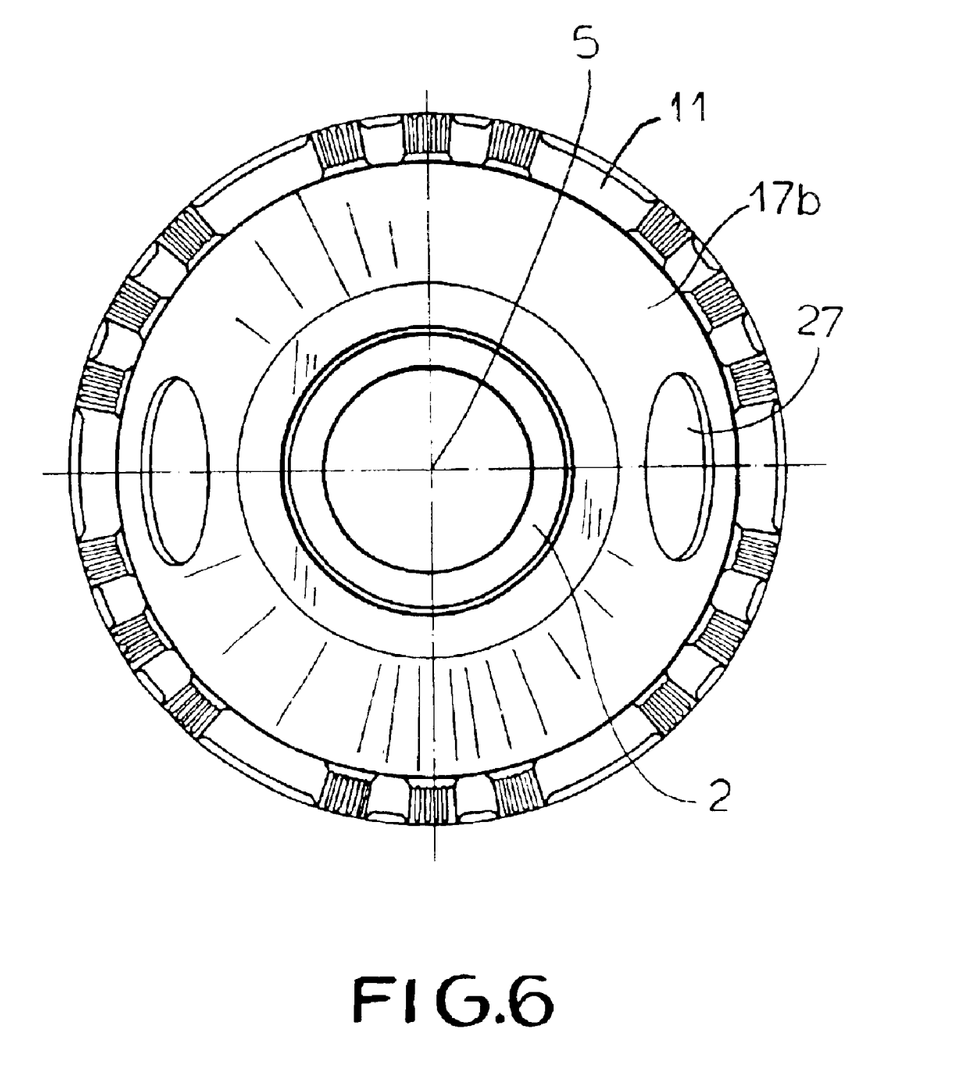
FIG. 6 is an end view taken in the direction of arrow VI of FIG. 5.

In FIGS. 5 and 6 the sleeve 17b is formed with a plurality of relatively large radially throughgoing holes 27 that allow a users fingers to engage through them with the tightening sleeve 11. Thus although the sleeve 17b shields and protects the sleeve 11, it does not prevent the user from getting a good grip on the sleeve 11.

Figure 7:
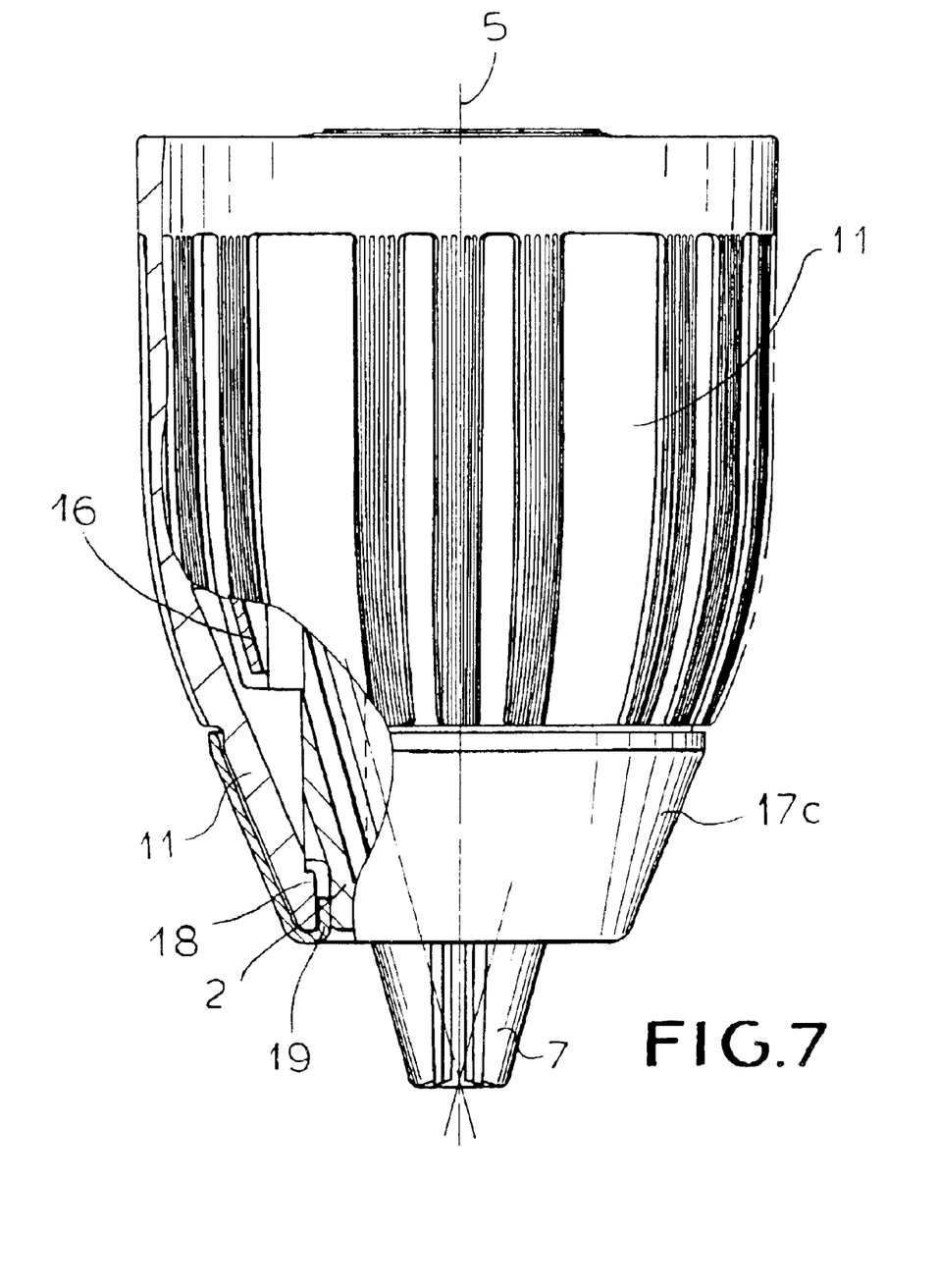
FIGS. 7, 8, 9, and 10 are side views partly in axial section through further chucks in accordance with the invention.

In FIG. 7 the sleeve 17c wraps all the way to the very front end of the chuck. Thus only the jaws 7 and any tool held by them can project axially forward past the sleeve 17c, providing excellent protection against unintentional rotation of the sleeve 11 and damage to the chuck.

Figure 8:
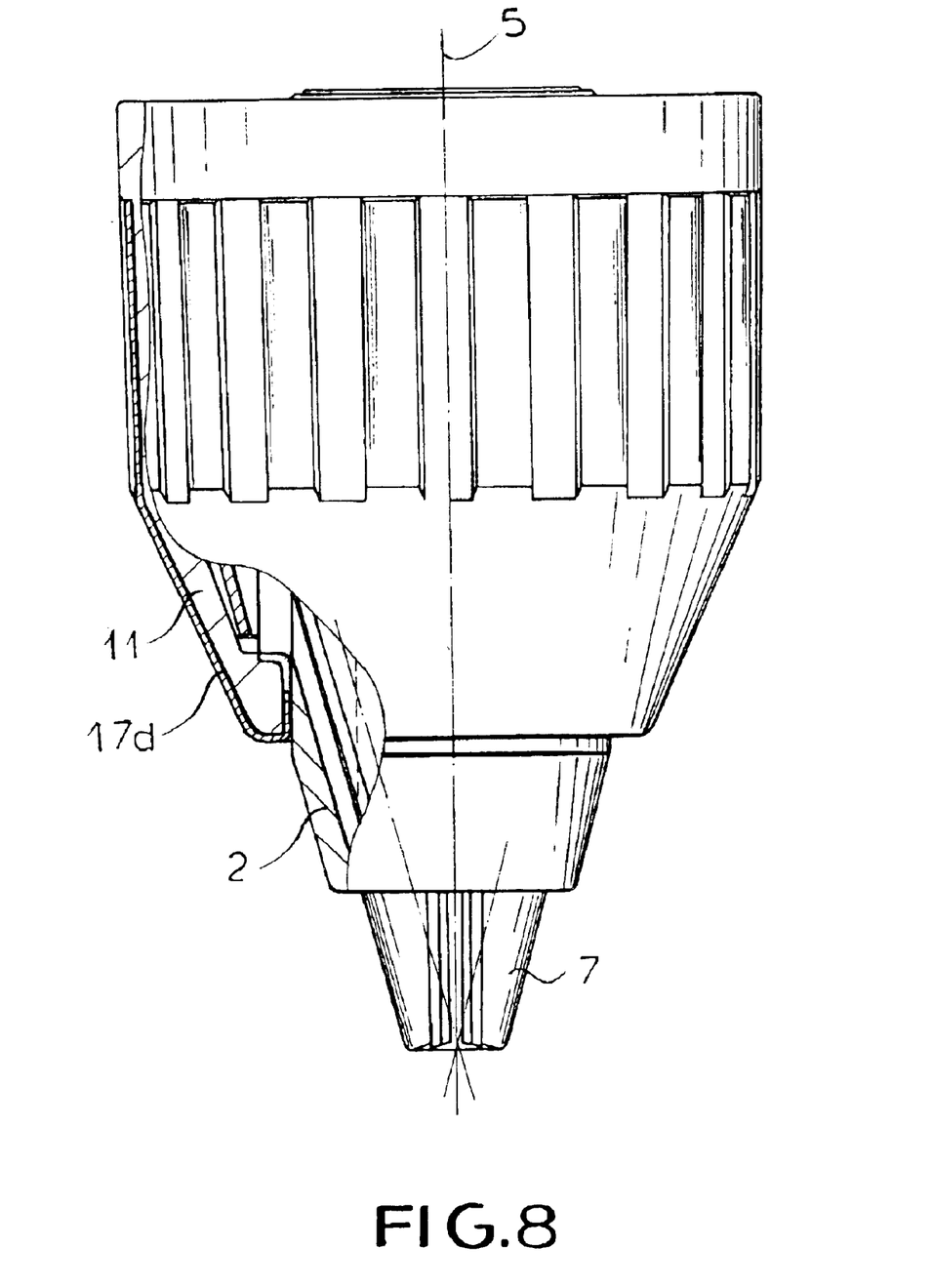

FIG. 8 shows a sleeve 17d retracted considerably back and simply wrapped around a front end of the sleeve 11. This sleeve 17d extends over almost the full axial length of the sleeve 11, but can be squeezed inwardly by the user to rotate the sleeve 11. Nonetheless accidental engagement of the sleeve 17d with a stationary workpiece during a drilling operation will not be sufficient to transmit any significant torque to the sleeve 11.

Figure 9:
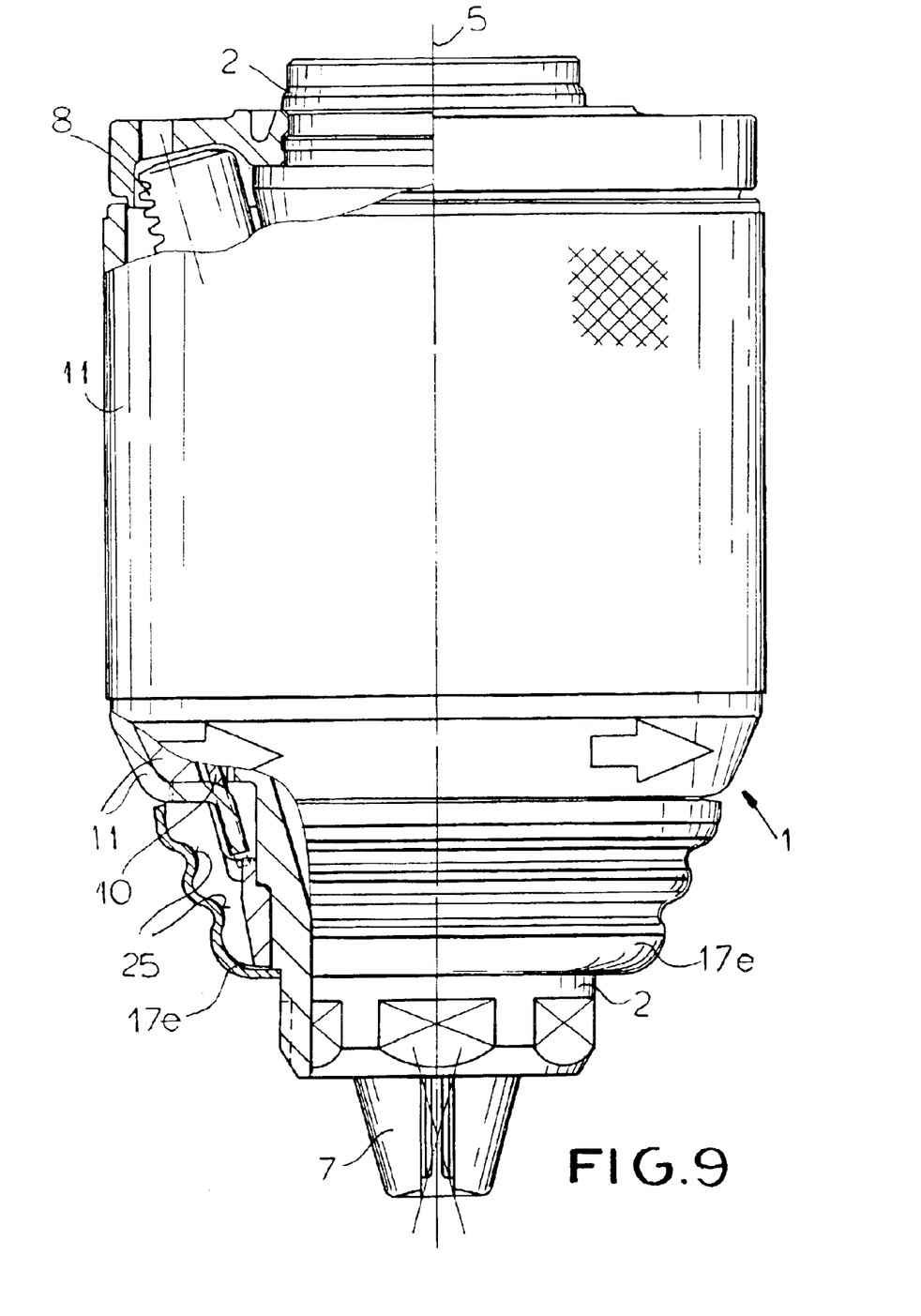
Figure 10:
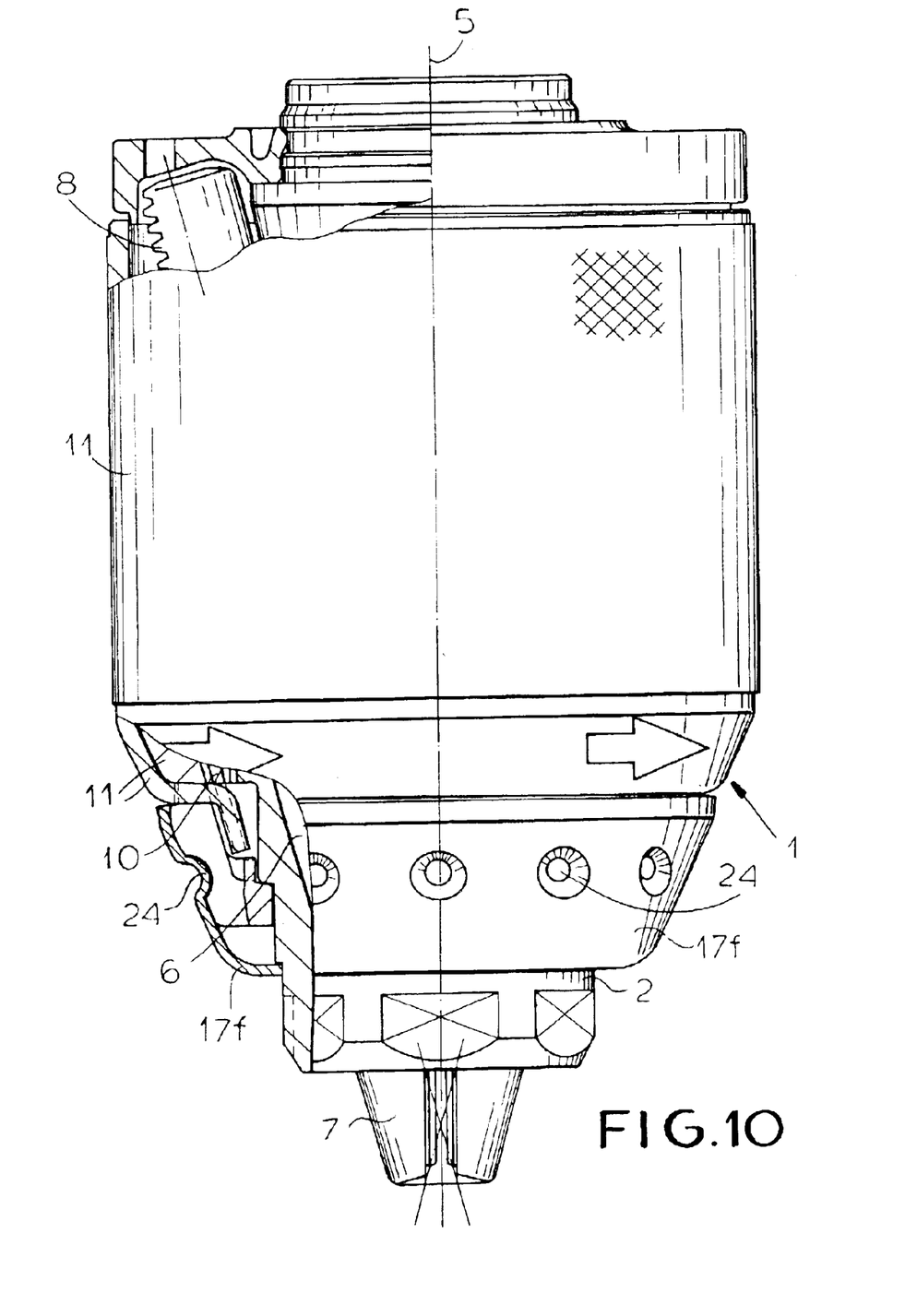

The chuck of FIG. 9 has a sleeve 17e formed with two of the radially inwardly projecting grooves 25 sliding in complementary grooves formed in a front-end extension fo the sleeve 11. FIG. 10 has a chuck formed with an array of inwardly stamped bumps 24 that engage in a single radially outwardly open groove of a front end of the sleeve 11 to rotationally mount the sleeve 17f on the sleeve 11. In the chucks of FIGS. 7, 9, and 10, much more than half of the sleeve 11 is exposed so that it is easy for the user to grip it and open or close the chuck.

I claim:

1. A drill chuck comprising:

a chuck body rotatable about a chuck axis and having a rear end adapted to fit with a drive spindle and a front end formed with a tool recess;

a plurality of jaws angularly spaced on the body about the axis, exposed in the tool recess, and radially displaceable relative to the body between inner and outer positions;

a tightening ring axially fixed but rotatable about the axis on the body in a tightening direction and in an opposite loosening direction;

coupling means including screwthread formations between the tightening ring and the jaws for moving the jaws radially together on rotation of the tightening ring in the tightening direction and for moving the jaws radially apart on rotation of the tightening ring in the loosening direction;

a tightening sleeve surrounding the body, connected to the tightening ring, and adapted to be gripped by hand to rotate is the ring in the directions;

a shield sleeve surrounding the body between the tightening sleeve and the body front end; and retaining means on the tightening sleeve supporting the shield sleeve on the tightening sleeve for rotation thereon about the axis independently of the body and of the tightening sleeve.

2. The drill chuck defined in claim 1 wherein the tightening sleeve has a front-end support ring rotatably supporting the shield sleeve and partially constituting the retaining means.

3. The drill chuck defined in claim 2 wherein the shield sleeve has a front-end rim engaged around, partially constituting the means, and angularly slidable on the support ring.

4. The drill chuck defined in claim 2 wherein the means includes rolling elements carried on the tightening sleeve and engaging and supporting the shield sleeve.

5. The drill chuck defined in claim 4 wherein the rolling elements are balls.

6. The drill chuck defined in claim 5 wherein the support ring is formed as a cage holding the balls.

7. The drill chuck defined in claim 2 wherein the tightening sleeve has a surface on which the shield sleeve slides.

8. The drill chuck defined in claim 1 wherein the shield sleeve has a radially inwardly projecting formation and the tightening sleeve is formed with a radially outwardly open groove slidably receiving the formation.

9. The drill chuck defined in claim 8 wherein the formation is an array of stamped inwardly projecting bumps.

10. The drill chuck defined in claim 8 wherein the formation is a radially inwardly projecting annular ridge.

11. The drill chuck defined in claim 1 wherein the shield sleeve has a tapered rear edge.

12. The drill chuck defined in claim 1 wherein the shield sleeve projects axially rearward over a portion of the tightening sleeve.

13. A drill chuck comprising:
- a chuck body rotatable about a chuck axis and having a rear end adapted to fit with a drive spindle and a front end formed with a tool recess;
- a plurality of jaws angularly spaced on the body about the axis, exposed in the tool recess, and radially displaceable relative to the body between inner and outer positions;
- a tightening ring axially fixed but rotatable about the axis on the body in a tightening direction and in an opposite loosening direction;
- means including screwthread formations between the tightening ring and the jaws for moving the jaws radially together on rotation of the tightening ring in the tightening direction and for moving the jaws radially apart on rotation of the tightening ring in the loosening direction;
- a tightening sleeve surrounding the body, connected to the tightening ring, and adapted to be gripped by hand to rotate the ring in the directions;
- a shield sleeve surrounding the body between the tightening sleeve and the body front end, projecting axially rearward over a portion of the tightening sleeve, and formed with radially throughgoing holes dimensioned to allow a user's fingers to engage through the holes directly with the tightening sleeve; and
- means supporting the shield sleeve on the body for rotation thereon about the axis independently of the body and of the tightening sleeve.

14. A drill chuck comprising:
- a chuck body rotatable about a chuck axis and having a rear end adapted to fit with a drive spindle and a front end formed with a tool recess;
- a plurality of jaws angularly spaced on the body about the axis, exposed in the tool recess, and radially displaceable relative to the body between inner and outer positions;
- a tightening ring axially fixed but rotatable about the axis on the body in a tightening direction and in an opposite loosening direction;
- means including screwthread formations between the tightening ring and the jaws for moving the jaws radially together on rotation of the tightening ring in the tightening direction and for moving the jaws radially apart on rotation of the tightening ring in the loosening direction;
- a tightening sleeve surrounding the body, connected to the tightening ring, and adapted to be gripped by hand to rotate the ring in the directions;
- a shield sleeve surrounding the body between the tightening sleeve and the body front end and extending axially forward past the chuck body; and
- means supporting the shield sleeve on the body for rotation thereon about the axis independently of the body and of the tightening sleeve.

15. The drill chuck defined in claim 1 wherein the shield sleeve is of sheet metal.

16. The drill chuck defined in claim 1 wherein the chuck body is formed with a radially forwardly directed annular shoulder and the shield sleeve bears axially rearwardly on and is slidable on the shoulder.

* * * * *